Figure 1:
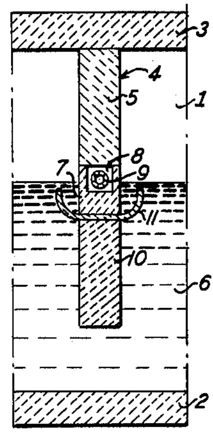

Dec. 28, 1965 E. PLUMAT 3,226,220

DEVICE FOR THE PROTECTION OF BARRIERS IN GLASS FURNACES

Filed June 22, 1962

INVENTOR

EMILE PLUMAT

BY John J. Hart ATTORNEY

United States Patent Office 3,226,220

Patented Dec. 28, 1965

3,226,220

DEVICE FOR THE PROTECTION OF BARRIERS IN GLASS FURNACES

Emile Plumat, Gilly, Belgium, assignor to S. A. Glaverbel, Brussels, Belgium, a company of Belgium Filed June 22, 1962, Ser. No. 204,494
Claims priority, application Belgium, Sept. 6, 1961, 484,409, Patent 607,898
4 Claims. (Cl. 65—342)

The present invention relates to a method of and an apparatus for the protection of barriers in glass furnaces.

Barriers are members of refractory material disposed transversely in glass furnaces and submerged in the glass for the purpose of acting on the glass currents and retaining the impurities floating on the surface of the glass bath. There exist barriers floating on the molten glass in such manner that their upper face emerges by a few centimeters above the surface of the bath. Other barriers are anchored in the walls of the furnace. They may also consist of a wall descending from the arch and dipping into the bath, or of a wall raised from the hearth and emerging from the bath, the submerged portion being formed with apertures for the passage of the glass.

Barriers are subjected to extremely severe operating conditions due to the high temperatures obtaining in the furnace, to the atmosphere charged with dust which has a corrosive action on the non-submerged portion of the barriers, and to the corrosive action of the glass and of the unmelted starting materials which may sometimes reach them. Also, an erosive effect is exerted by the glass currents. The resistance of barriers to erosion and above all to corrosion is lower in proportion as the temperature is higher. Corrosion is particularly great in the neighborhood of the line of the level of the glass bath, and the trace of this line is marked by a wide recess in each of the vertical faces of the barrier.

The material thus removed from the barriers is carried along by the glass, one portion being digested by the latter and the other remaining in the form of grains which are to be found in the finished product. These two portions of material removed from the barriers are harmful to the production of the glass, because, whether or not they are digested by the latter they do not diffuse sufficiently into the glass to form a homogeneous mixture therewith and they are always to be found in the form of heterogeneities in the product, the quality of which is thereby impaired.

The method according to the invention obviates these disadvantages. In this method, the molten glass situated in the neighborhood of at least one of the faces of the barrier is protected from the action of the convection currents obtaining in the molten mass. For this purpose, the mass of molten glass is separated from the glass in the neighbourhood of the barrier by disposing a partition along the face to be protected in order to impede the convective action of this molten mass. In addition, the molten glass in the neighbourhood of the face to be protected may be cooled so as to increase its viscosity and to prevent the formation of convection currents.

Thus, the glass in contact with that portion of the barrier which is most exposed to the action does not participate in the movement of the convection currents of the glass, which becomes heated in the hot molten zone. It therefore retains a relatively low temperature, which renders it less corrosive and tends to prevent the formation of glass currents. Moreover, any material of the barrier which is nevertheless dissolved remains confined in this stagnant glass zone and cannot migrate into the glass mass which is to be shaped.

The barrier according to the invention comprises on at least one of its vertical walls and below the level of the glass bath at least one partition means composed of material resistant to the attack of molten glass and rising to a level close to the surface of the glass bath, so as to form therebetween a compartment substantially to retain the glass in the neighbourhood of the barrier. The partition means advantageously consists of a profiled element connected to the barrier, preferably fitted between two superposed component elements of the barrier. The latter may comprise cooling means for cooling the glass of the compartment formed by the partition and the wall of the barrier.

A number of embodiments of the invention are illustrated by way of example in the accompanying drawings.

Figure 2:
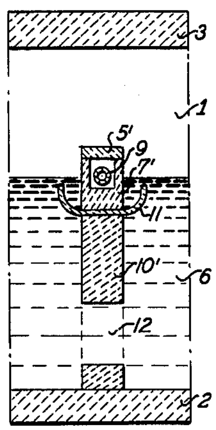
Figure 3:
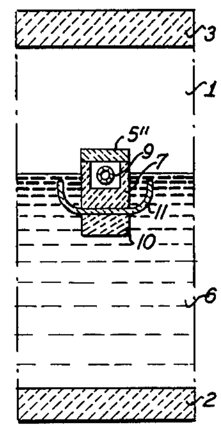
Figure 4:
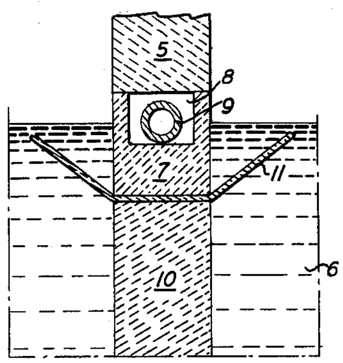
Figure 5:
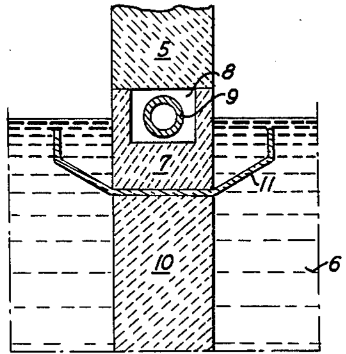
Figure 6:
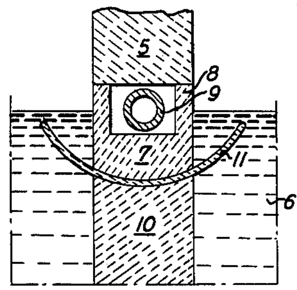

FIGURE 1 is a longitudinal section through that part of a glass furnace which is provided with a barrier according to the invention, FIGURES 2 and 3 illustrate the application of the invention to two other forms of barriers, and FIGURES 4, 5 and 6 illustrate variants of the form of the partition separating the glass in the neighbourhood of the barrier from the mass of molten glass.

In the embodiment illustrated in FIGURE 1, the furnace is formed of two walls 1, the hearth 2 and the arch 3. The screen barrier 4 according to the invention, which is illustrated by way of example, is composed of a number of superposed contiguous elements. An element 5 disposed in the upper part of the furnace between the walls 1 extends from the arch 3 to a level close to the surface of the glass bath 6. A second element 7 of smaller height is disposed against the lower face of the element 5. It penetrates into the glass bath 6 and its upper face is formed with a longitudinal groove 8 into which there is let a pipe 9 through which a cooling fluid is passed. A lower element 10 is situated below the cooled element 7. A partition 11 consisting of a material resistant to the action and the temperature of the glass is inserted between the elements 7 and 10 over the entire width of the furnace. The said partition 11 includes extensions or portions which extend to a considerable distance into the glass, preferably on either side of the barrier, and each such extension or portion is so curved that its free edge is as close as possible to the surface of the glass bath, for the purpose of substantially preventing circulation of glass over the edge. The said edge must be prevented from exceeding the level of the glass in order to protect it from the oxidising and corrosive atmosphere of the furnace. As previously indicated each extension or portion forms with the associated submerged portion of the outer facing surface of the wall a compartment for containing molten glass and to form with such glass a stagnant glass zone protecting such surface portion against the currents of molten glass and confining any material of the barrier which may become dissolved.

In the above example, the cooling of the glass is effected by the cooling of the barrier, but it may equally well be effected by any other means, for example with the aid cooling pipes disposed above the glass contiguous to the walls of the barrier.

The invention is obviously applicable to all types of barriers, and FIGURES 2 and 3 illustrate two other embodiments.

In accordance with FIGURE 2, the barrier consists of a wall raised from the hearth 2 between the walls 1. The said wall is composed of three elements. The partition 11 is inserted between the lower element 10', which is formed with apertures 12 for the passage of the glass, and the intermediate element 7' cooled by the pipe 9. A third element 5' in the form of a plate covers the element 7'.

FIGURE 3 illustrates a barrier floating or anchored in the walls of the furnace and occupying only the upper portion of the glass bath 6, from which it emerges. The partition 11 is also inserted between a lower element 10'' and an intermediate element 7'' emerging from the glass bath 6 and cooled by the pipe 9. An element 5'' covers the upper wall of the cooled element 7''.

The partition 11 may obviously be given any appropriate shape, for example those illustrated in FIGURES 4, 5 and 6.

Of course, the invention is not limited to the embodiments which have been described and illustrated by way of example, and modifications may be made thereto without departing from the scope of the invention.

I claim:

1. In a glass furnace, a barrier comprising a transverse wall having a submerged portion with an outer facing surface exposed to the action of the currents of molten glass, and means for protecting an intermediate submerged portion of such facing surface from the moving glass in the bath including partition means composed of material resistant to attack by the moving molten glass, said partition means including a portion wholly submerged in said glass bath and extending outwardly from said barrier facing surface forming with said submerged intermediate portion of such facing surface on the associated side of said wall a compartment for containing molten glass, said portion of said partition means providing a barrier against entry of currents of molten glass into the compartment area defined by said portion of said partition means and said intermediate surface portion, and creating in such compartment area a zone of stagnant molten glass capable of protecting such intermediate surface portion against the currents of molten glass in the bath.

2. A barrier such as defined in claim 1, including means for cooling the stagnant molten glass in the compartment area.

3. A barrier such as defined in claim 1, in which said partition means is connected to said wall below said submerged intermediate portion of said facing surface and the outer end of said portion thereof extends to a point just below the level of the glass bath so that the compartment area containing the stagnant molten glass extends upwardly from said place of connection almost to the level of the bath.

4. A barrier such as defined in claim 3, including cooling means located in the region of the level of the bath adjacent to the upper end of said compartment area for cooling the stagnant molten glass in such compartment area.

References Cited by the Examiner

UNITED STATES PATENTS

| | | | |
|---|---|---|---|
| 1,541,906 | 6/1925 | Delacuvellerie | 65—343 XR |
| 1,558,986 | 10/1925 | Jones | 65—338 XR |
| 1,641,898 | 9/1927 | Neenan | 65—337 |
| 1,835,690 | 12/1931 | Bowman | 65—343 XR |
| 1,920,692 | 8/1933 | Halbach | 65—343 XR |

FOREIGN PATENTS

| | | |
|---|---|---|
| 667,700 | 3/1952 | Great Britain. |

HOWARD R. CAINE, *Acting Primary Examiner.*

DONALL H. SYLVESTER, *Examiner.*